US008341533B2

(12) United States Patent
Wyman et al.

(10) Patent No.: US 8,341,533 B2
(45) Date of Patent: Dec. 25, 2012

(54) STORAGE AND EXPEDITED RETRIEVAL OF MESSAGES AND RESPONSES IN MULTI-TASKING ENVIRONMENTS

(75) Inventors: Joseph Wyman, Boston, MA (US);
Frank Fitzlaff, Langnau a.A. (CH);
Jonathan Howe, Portland, ME (US);
Serhiy Serbin, Baar (CH)

(73) Assignee: Microsoft Corporation, Redmond, WA (US)

( * ) Notice: Subject to any disclaimer, the term of this patent is extended or adjusted under 35 U.S.C. 154(b) by 769 days.

(21) Appl. No.: 12/134,198

(22) Filed: Jun. 6, 2008

(65) Prior Publication Data
US 2009/0307606 A1    Dec. 10, 2009

(51) Int. Cl.
*G06F 3/00* (2006.01)
(52) U.S. Cl. ........ 715/752; 715/753; 715/756; 715/758; 379/70; 379/88.01; 379/88.11; 379/93.23; 379/93.27
(58) Field of Classification Search .................. 715/752, 715/753, 756, 758; 379/70, 88.01, 88.11, 379/93.27, 93.23
See application file for complete search history.

(56) References Cited

U.S. PATENT DOCUMENTS
6,590,887 B1    7/2003  Lee
(Continued)

FOREIGN PATENT DOCUMENTS
AU    WO2005088994 A1    9/2005
(Continued)

OTHER PUBLICATIONS

Cisco systems, Inc, Cisco Unfied CallConnector for Microsoft Office User's Guide; Copyright 2000-2007; http://www.cisco.com/en/US/docs/voice_ip_comm/cucallconnectors/1.5/client_admin.pdf; 295 pages.*

(Continued)

*Primary Examiner* — Doon Chow
*Assistant Examiner* — Linh K Pham
(74) *Attorney, Agent, or Firm* — Hope Baldauff Hartman, LLC

(57) ABSTRACT

Tools and techniques are described for storage and expedited retrieval of messages and responses in multi-tasking environments. Methods provided by these tools may establish active communications with a first contact, and then received indications of secondary communications involving a second contact. These methods may then present user interfaces (UIs) that include representations of at least the secondary communications. Through the UIs, the methods may receive a selection of one of the secondary communications for an expedited response, and may receive input from the user that provides the expedited response to the secondary communication, while maintaining the active communication in an active state. These methods may provide the expedited response to the secondary communication, based upon the input received from the user.

2 Claims, 6 Drawing Sheets

U.S. PATENT DOCUMENTS

| | | | |
|---|---|---|---|
| 6,981,223 B2 | 12/2005 | Becker et al. | |
| 7,230,745 B1* | 6/2007 | Street, Jr. | 358/434 |
| 7,315,613 B2 | 1/2008 | Kleindienst et al. | |
| 7,848,506 B1* | 12/2010 | Infosino | 379/215.01 |
| 2002/0130904 A1* | 9/2002 | Becker et al. | 345/753 |
| 2003/0078033 A1 | 4/2003 | Sauer et al. | |
| 2003/0097406 A1 | 5/2003 | Stafford | |
| 2004/0264653 A1* | 12/2004 | Revisky et al. | 379/88.12 |
| 2004/0268263 A1* | 12/2004 | Van Dok et al. | 715/733 |
| 2005/0018833 A1* | 1/2005 | Wang et al. | 379/215.01 |
| 2005/0198147 A1 | 9/2005 | Pastro et al. | |
| 2005/0286689 A1* | 12/2005 | Vuori | 379/88.22 |
| 2006/0026254 A1 | 2/2006 | Kessen et al. | |
| 2006/0132595 A1* | 6/2006 | Kenoyer et al. | 348/14.08 |
| 2007/0106948 A1 | 5/2007 | Ala-Rantala | |
| 2007/0189475 A1* | 8/2007 | Pearson | 379/142.01 |
| 2008/0068447 A1* | 3/2008 | Mattila et al. | 348/14.08 |
| 2008/0107244 A1* | 5/2008 | Setzer et al. | 379/88.12 |
| 2008/0129816 A1* | 6/2008 | Mattila et al. | 348/14.08 |
| 2009/0089683 A1* | 4/2009 | Thapa | 715/756 |

FOREIGN PATENT DOCUMENTS

KR　　WO2007061251 A1　　5/2007

OTHER PUBLICATIONS

"Windows Mobile 2002 New Features", Microsoft Corporation, 2008, pp. 2.

"Sametime Mobile Version 7.5.1 CF1 User Guide", International Business Machines Corporation, 2006-2007, pp. 46.

"AOL Instant Messenger", Nextel Communications Inc., 2005, p. 1.

"Sametime Mobile Version 7.5.1 CF1 User Guide", Downloaded Jan. 31, 2008 from http://publib.boulder.ibm.com/infocenter/sametime/v7r5ml/topic/com.ibm.help.sametime.home.doc/st751mobile.pdf, International Business Machines Corporation, pp. 46.

* cited by examiner

STORAGE AND EXPEDITED RETRIEVAL OF MESSAGES AND RESPONSES IN MULTI-TASKING ENVIRONMENTS

BACKGROUND

Communications technologies are continuing to proliferate across a variety of different channel types and modalities. Previously, the bulk of person-to-person communications occurred over voice channels, but more recently, a variety of text-based communications modes have become more prevalent. In this environment, end-users may process volumes of incoming or outgoing voice and text-based message traffic, multi-tasking between different types of messages.

SUMMARY

Tools and techniques are described for storage and expedited retrieval of messages and responses in multi-tasking environments. Methods provided by these tools may establish active communications with a first contact, and then received indications of secondary communications involving a second contact. These methods may then present user interfaces (UIs) that include representations of the secondary communications. Through the UIs, the methods may receive a selection of one of the secondary communications for an expedited response, and may receive input from the user that provides the expedited response to the secondary communication, while maintaining the active communication in an active state. These methods may provide the expedited response to the secondary communication, based upon the input received from the user.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
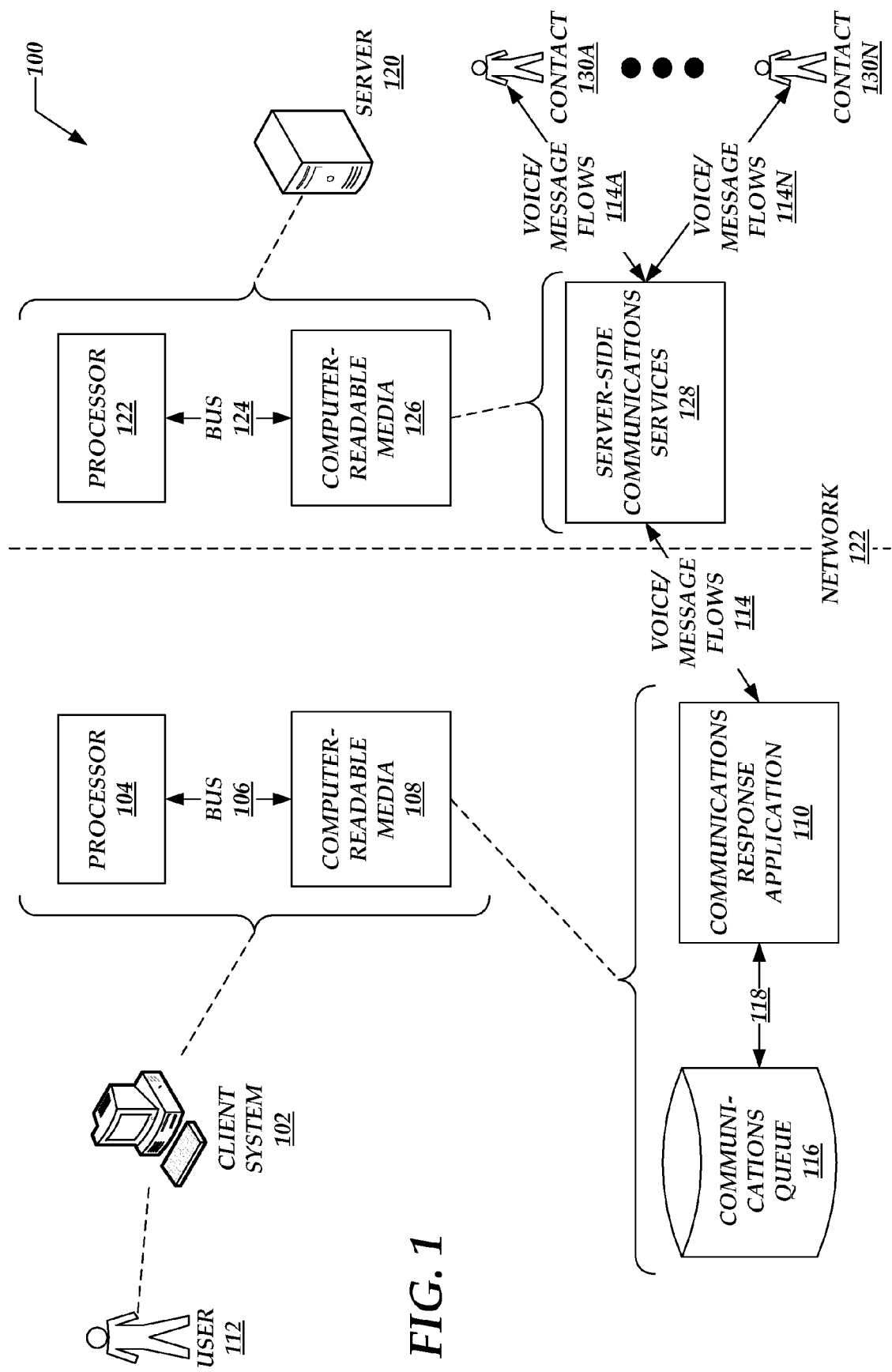
FIG. 1 is a combined block and flow diagram illustrating systems or operating environments for storage and expedited retrieval of messages and responses in multi-tasking environments.

The following detailed description is directed to technologies for storage and expedited retrieval of messages and responses in multi-tasking environments. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for storage and expedited retrieval of messages and responses in multi-tasking environments will be described.

FIG. 1 illustrates systems or operating environments, denoted generally at 100, for storage and expedited retrieval of messages and responses in multi-tasking environments. These systems 100 may include one or more client systems 102, with FIG. 1 providing one client system for clarity of illustration only. However, implementations of the description herein may include any number of client systems.

The graphical elements used in FIG. 1 to depict the client systems 102, and other components shown herein, are chosen only to facilitate illustration, and not to limit possible implementations of this description. More particularly, FIG. 1 illustrates the client system 102 as a desktop computing system, but the client system could also be a mobile, notebook, or laptop computing system.

Turning to the client systems 102 in more detail, the client systems may include one or more processors 104, which may have a particular type or architecture, chosen as appropriate for particular implementations. The processors 104 may couple to one or more bus systems 106 chosen for compatibility with the processors 104.

The client systems 102 may also include one or more instances of computer-readable storage media 108, which couple to the bus systems 106. The bus systems may enable the processors 104 to read code and/or data to/from the computer-readable storage media 108. The media 108 may represent storage elements implemented using any suitable technology, including but not limited to semiconductors, magnetic materials, optics, or the like. The media 108 may include memory components, whether classified as RAM, ROM, flash, or other types, and may also represent hard disk drives.

The storage media 108 may include one or more data structures and modules of instructions that, when loaded into the processor 104 and executed, cause the client systems 102 to perform various techniques for providing improved storage and retrieval of messages and responses in multi-tasking environments. Examples of these modules may include a communications response application 110, which may enable users 112 to interact with the client system 102 in managing and participating with bidirectional voice and/or message flows 114. Examples of the data structures may include communication queues 116, maintained by the communications response application 110 as represented generally by the arrow 118. As incoming communications arrive at the client system 102, or as the users 112 initiate outgoing communications from the client system 102, the communications response application may create entries in the communications queues 116. In turn, the user 112 may select incoming or outgoing communications from the queue as appropriate.

Examples of the end-users 112 may include users handling a high volume of call or text traffic in, typically, a front-line communications support role, whether for a particular team or for an entire enterprise. Without loss of generality, these users may include receptionists, team administrators, switchboard operators, or the like.

The client systems 102 may communicate with one or more external servers or server systems 120 over one or more intermediate networks 122, which generally represent any protocols, adapters, components, and other general infrastructure associated with wired and/or wireless communications networks. Such networks 122 may be global, regional, local, and/or personal in scope and nature, as appropriate in different implementations.

Turning to the server systems 120 in more detail, the server systems may include one or more processors 123, which may have a particular type or architecture, chosen as appropriate for particular implementations. The processors 123 may couple to one or more bus systems 124 chosen for compatibility with the processors 123. The processors 123 and bus systems 124 in the server systems 120 may or may not be upbeat same type and architecture as the processor 104 and bus systems 106 in the client systems 102.

The server systems 120 may also include one or more instances of computer-readable storage media 126, which couple to the bus systems 124. The bus systems may enable the processors 123 to read code and/or data to/from the computer-readable storage media 126. The media 126 may represent storage elements implemented using any suitable technology, including but not limited to semiconductors, magnetic materials, optics, or the like. The media 126 may include memory components, whether classified as RAM, ROM, flash, or other types, and may also represent hard disk drives.

The storage media 126 may include one or more data structures and modules of instructions that, when loaded into the processors 123 and executed, cause the server systems 120 to perform various techniques for providing improved storage and retrieval of messages and responses in multi-tasking environments. Examples of these modules may include modules 128 that provide server-side communications services. More specifically, the modules 128 may enable any number of remote users or contacts 130a and 130n (collectively, contacts 130) to communicate over the network 122 with the client system 102 and/or user 112. These communications with particular contacts 130 may include, but are not limited to, voice, video, and/or text-based message flows, with examples of such voice/message flows denoted respectively at 114a and 114n. In some cases, users 112 may escalate text-based communications to voice and/or video, and vice versa.

Having described at the systems or operating environments 100 for providing improved storage and retrieval of messages and responses in multi-tasking environments, the discussion now turns to a more detailed description of example message flows and related representations as provided by the communications response application. This description is now provided with FIG. 2.

Figure 2:
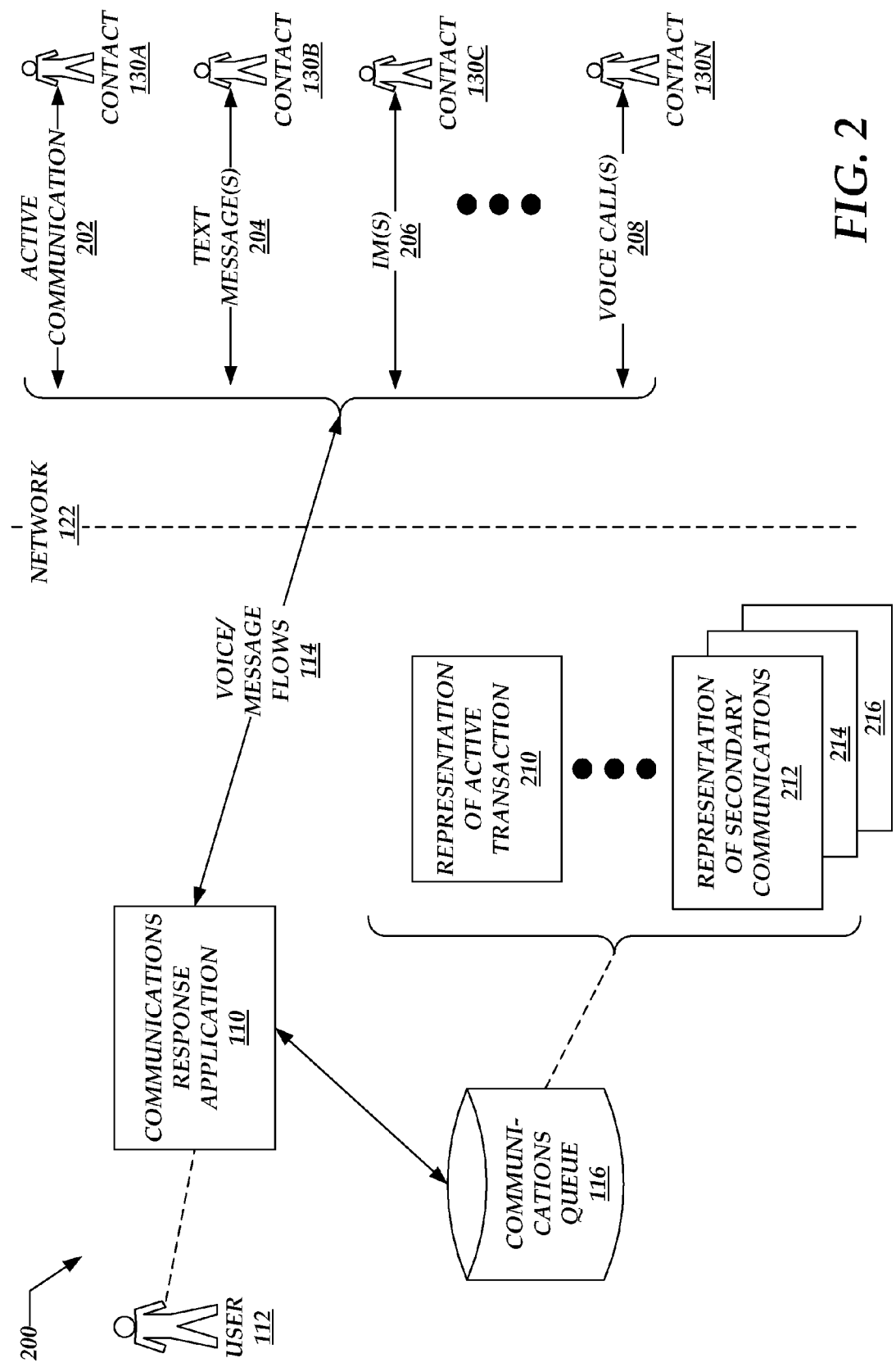
FIG. 2 is a combined block and flow diagram illustrating additional aspects of example message flows and related representations as provided by a communications response application.

FIG. 2 illustrates additional aspects, denoted generally at 200, of example message flows and related representations as provided by the communications response application. For convenience of description, but not to limit possible implementations, FIG. 2 may carry forward some elements from previous drawings, and denote them with identical reference numbers. For example, FIG. 2 carries forward the user 112, the communications response application 110, the communications queue 116, the voice/message flows 114, and the network 122.

Turning to FIG. 2 in more detail, the communications response application 110 may establish and support an ongoing active communication 202 between the user 112 and an active contact 130a. This active communication 202 may represent voice-based, text-based, or other types of communications, which may be supported by suitable technology as appropriate in different implementations. This description discusses an example in which the active communication 202 is a voice-based communication, but it is noted that implementations may support active communications of any type.

While the active communication 202 is in an active, ongoing state, with the user 112 and the contact 130a exchanging, for example, voice-based messages, one or more additional contacts (e.g., 130b, 130c, and/or 130n) may initiate or receive any number of secondary communications involving the user 112. In the example shown, the contact 130b may initiate or receive a text message 204 involving the user 112, the contact 130c may initiate or receive an instant message (IM) 206 involving the user 112, and the contact 130n may initiate or receive a voice call 208 involving the user 112. Although not shown explicitly in FIG. 2 in the interest of clarity, the server system 120 may facilitate transmitting voice and/or message flows 114 related to these various communications (e.g., 202, 204, 206, and/or 208) over the network 122 to the client system 102 for viewing by the user 112.

While FIG. 2 illustrates several examples of incoming or outgoing contacts, these examples are not exhaustive in nature, but are provided only to facilitate the present description. Other examples of these contacts, and related active or secondary communications, may include conference invitations, messages sent according to the short message service (SMS) protocol, video calls, task assignments, and the like. In some scenarios, the infrastructure described herein for providing expedited responses and messages may enable administrators acting on behalf of conference participants to update their respective supervisors on the status of the conference (e.g., "X" number of participants are currently in queue awaiting the start of the conference).

At the client end, the communications response application 110 may store representations of the active communication 202 and any secondary incoming or outgoing communications (e.g., 204, 206, and/or 208) in the communications queue 116. As shown in FIG. 2, the communications queue may include a representation 210 that corresponds to the ongoing active communication 202, as well as representations 212, 214, and 216 that correspond respectively to the secondary communications 204, 206, and 208. It is noted that the scenario shown in FIG. 2 is chosen only for example, and that implementations of this description may include any number of secondary communications.

Having described the additional aspects of example message flows and related representations as provided by the communications response application in FIG. 2, the discussion now turns to description of user interfaces (UIs) that may be presented in connection with managing the secondary communications along with the active communication. This description is now provided with FIG. 3.

Figure 3:
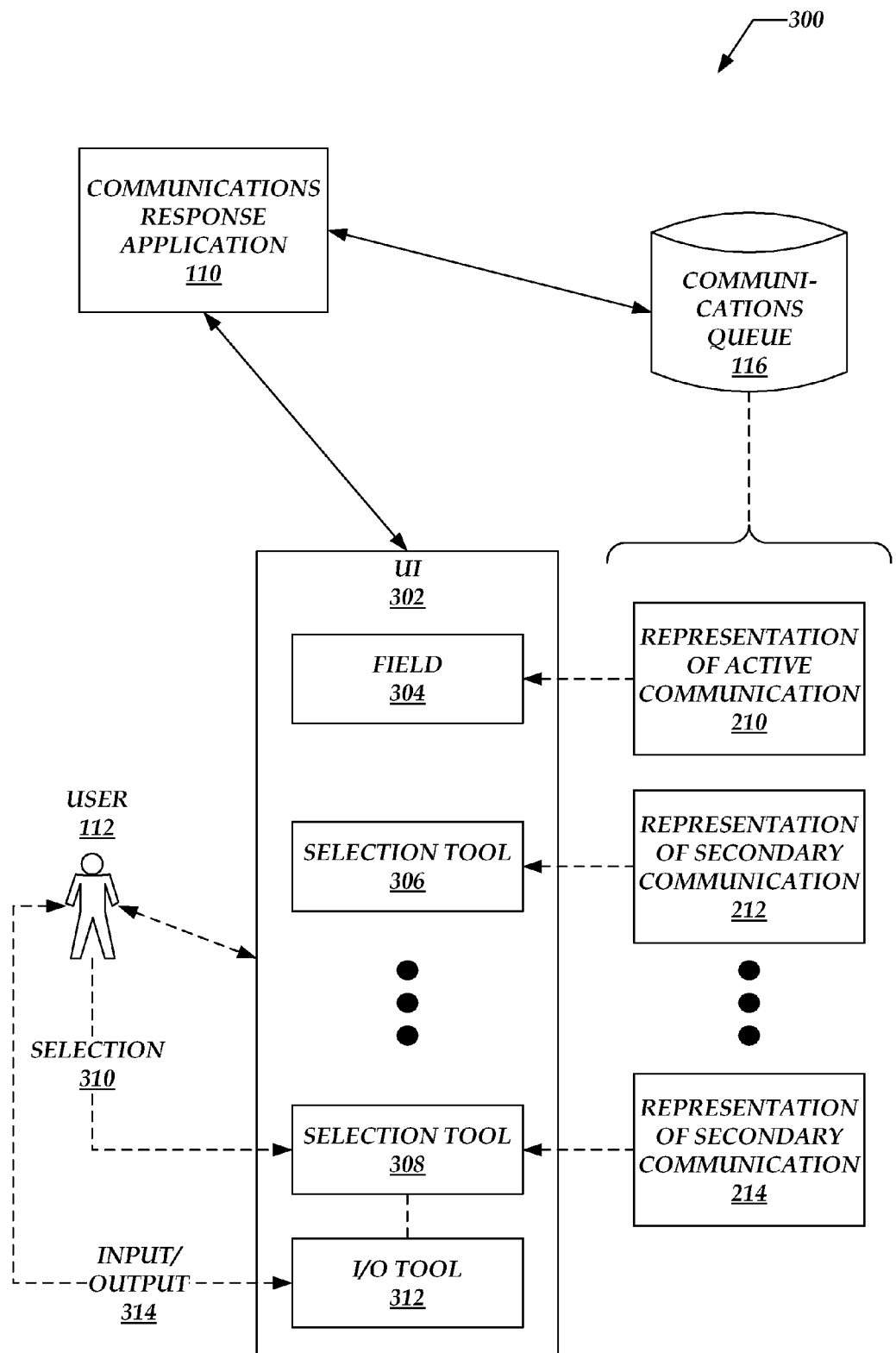
FIG. 3 is a block diagram illustrating aspects related to user interface (UI) elements that may be presented in connection with active and secondary communications.

FIG. 3 illustrates aspects, denoted generally at 300, related to user interface (UI) elements that may be presented in connection with active communications and secondary communications. For convenience of description, but not to limit possible implementations, FIG. 3 may carry forward some elements from previous drawings, and denote them with identical reference numbers. For example, FIG. 3 carries forward the user 112, the communications response application 110, the communications queue 116, the representation 210 of the active communication, and the representations 212 and 214 of the secondary communications.

Turning to FIG. 3 in more detail, the communications response application 110 may present a set of user interface elements, denoted collectively at 302, to the user 112 via the client system 102 (not shown in FIG. 3). More specifically, the UI elements 302 may include various UI tools that correspond to or represent entries in the communications queue 116. In the example shown, the communications queue includes the representation 210 of the active communication, along with representations 212 and 214 of secondary incoming or outgoing communications. In the example shown, the active communication is being actively conducted between the user 112 and a remote contact (e.g., 130a in FIG. 2), with the secondary communications occurring at any time during this active communication.

Turning to the UI elements 302 more specifically, a field 304 may correspond to the representation 210 of the active communication. This field 304 may, for example, provide status information related to the active communication (e.g., duration of the communication, name of the persons involved in the communication, or the like). A selection tool 306 may correspond to the representation 212 of a first secondary incoming or outgoing communication, and a selection tool 308 may correspond to the representation 214 of another secondary communication. For example, the selection tools 306 and 308 may be checkboxes or other suitable UI tools responsive to input from the user 112 to activate the corresponding communication for an expedited response using the tools and techniques described herein. In an example scenario shown in FIG. 3, the user 112 may activate the selection tool 308 that corresponds to the secondary communication represented at 214, with FIG. 3 representing a suitable selection signal at 310. In this manner, the user may select this secondary communication for an expedited reply or response.

An input/output tool 312 may be associated with the selection tool 308, as represented by the dashed line connecting blocks 312 and 308 in FIG. 3. Having selected the presentation 214 of a given secondary communication, the input/output tool 312 may enable the user 112 to provide, for example, keyboard input directed to the given secondary communication, while also participating in the active communication (e.g., 202 in FIG. 2) and maintaining the active communication in an active state. Put differently, the UI elements 302 may enable the user 112 to respond preliminarily to the secondary communication without interrupting or deactivating the active communication, thereby enhancing the user's ability to multitask the active and secondary communications. FIG. 3 denotes at 314 input from the user 112 to the input/output tool 312, in addition to representing outputs that result from such input.

In some implementation scenarios, the user 112 may select a given secondary communication using one of the UI selection tools (e.g., 306, 308, or the like), and then input a pre-defined hot key sequence. In turn, the UI 302 may respond to this hot key sequence by retrieving a predefined response associated with this hot key sequence, and presenting the retrieved response to the secondary communication. In these scenarios, the UI 302 would present only the selection tools 306 and 308, without presenting the additional I/O tool 312.

In other scenarios, the UI 302 may present the I/O tool 312 in response to the user activating, for example, the selection tool 308. As detailed further below, the I/O tool 312 may receive input from the user for either initiating a hotkey sequence, or for retrieving a pre-defined response.

Having described with FIG. 3 the example UI elements that may facilitate expedited replies or responses to secondary communications, the discussion now turns to a more detailed description of inputs and outputs that may be provided in connection with these expedited responses. This description is now provided with FIGS. 4 and 5.

Figure 4:
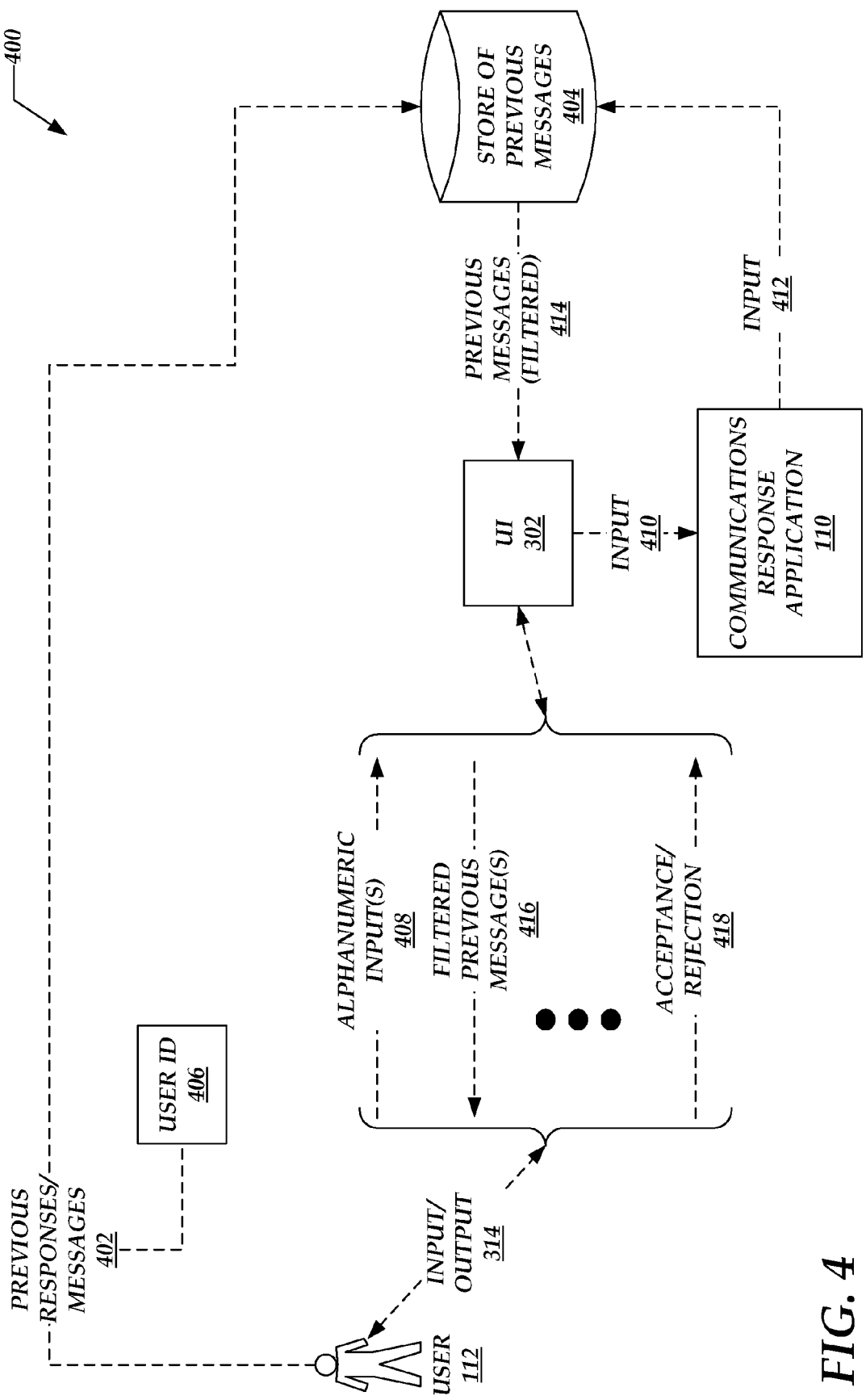
FIG. 4 is a combined block and flow diagram illustrating components and related flows for comparing current inputs to a store of previous inputs, and for presenting a list of candidate messages that is filtered according to these current inputs.

FIG. 4 illustrates components and flows, denoted generally at 400, related to comparing current inputs to a store of previous inputs, and presenting a list of candidate messages that is filtered according to these current inputs. For convenience of description, but not to limit possible implementations, FIG. 4 may carry forward some elements from previous drawings, and denote them with identical reference numbers. For example, FIG. 4 carries forward the user 112, the communications response application 110, and the inputs/outputs 314.

Turning to FIG. 4 in more detail, the user 112 may, over time, provide any number of responses and/or messages to various secondary communications, as denoted generally at 402. A store 404 may contain a history of these reviews responses, as associated with particular users, as represented by user identifiers 406. In cases where the user 112 has not yet responded to any secondary communications, the store 404 may be empty. However, as the user responds to such secondary communications, the store 404 may be populated with these responses. In some cases, particular users may use identical or similar responses over time to handle similar situations that arise repeatedly with various secondary communications, with the store 404 archiving these responses and indexing them by user identifiers 406.

Turning to the inputs/outputs 314 in more detail, the user 112 may provide one or more alphanumeric character inputs to the input/output tool 312 shown in FIG. 3. FIG. 4 denotes these alphanumeric inputs at 408, with these inputs including, for example, keyboard input in the form of one or more discrete characters or keystrokes. In turn, the UI 302 may receive these alphanumeric inputs 408, and pass these inputs to the communications response application 110, as represented at 410. The communications response application may search the store 404 or any previous messages or responses that match the alphanumeric inputs currently provided by the user 112, as represented generally at 412. For example, the store 404 may include one or more previous responses or messages from the user 112 that begin with the word "Please". If the alphanumeric input 408 begins with the characters "p" and "l", then the store 404 may exclude or filter out those responses or messages that do not begin with "pl", and return those responses or messages that do began with "pl". FIG. 4 denotes at 414 these filtered previous messages as retrieved from the store 404, and displayed in the UI 302 (e.g. in the input/output tool 312 shown in FIG. 3).

The user 112 may view these filtered previous messages in the UI 302, as denoted generally at 416. If any of these filtered previous messages 416 correspond to the message that the user currently wishes to send in response to the secondary communication, the user may select the appropriate message, thereby requesting that this message be sent as a response to the secondary communication. These messages may include, but are not limited to, text-based messages, voice-based messages, video messages, text files, documents, or the like. These messages may be transmitted over any suitable type of network (e.g., Internet Protocol (IP), Short Message Service (SMS), and the like).

On the other hand, if none of the filtered previous messages 416 correspond to what the user wishes to send in response to the secondary communication, the user may continue to enter additional alphanumeric input 408, thereby resulting in an additional filtering process through the store 404 of previous messages. Eventually, the user may either select one of the previous messages that result from this additional filtering, or may enter his or her desired message completely. In some instances, the components and flows shown in FIG. 4 may enable the user 112 to quickly recall and send previous messages that are contained in the store 404. In general, FIG. 4 notes at 418 either acceptances or rejections of previous messages or responses that were filtered based on current alphanumeric input provided by the user.

Figure 5:
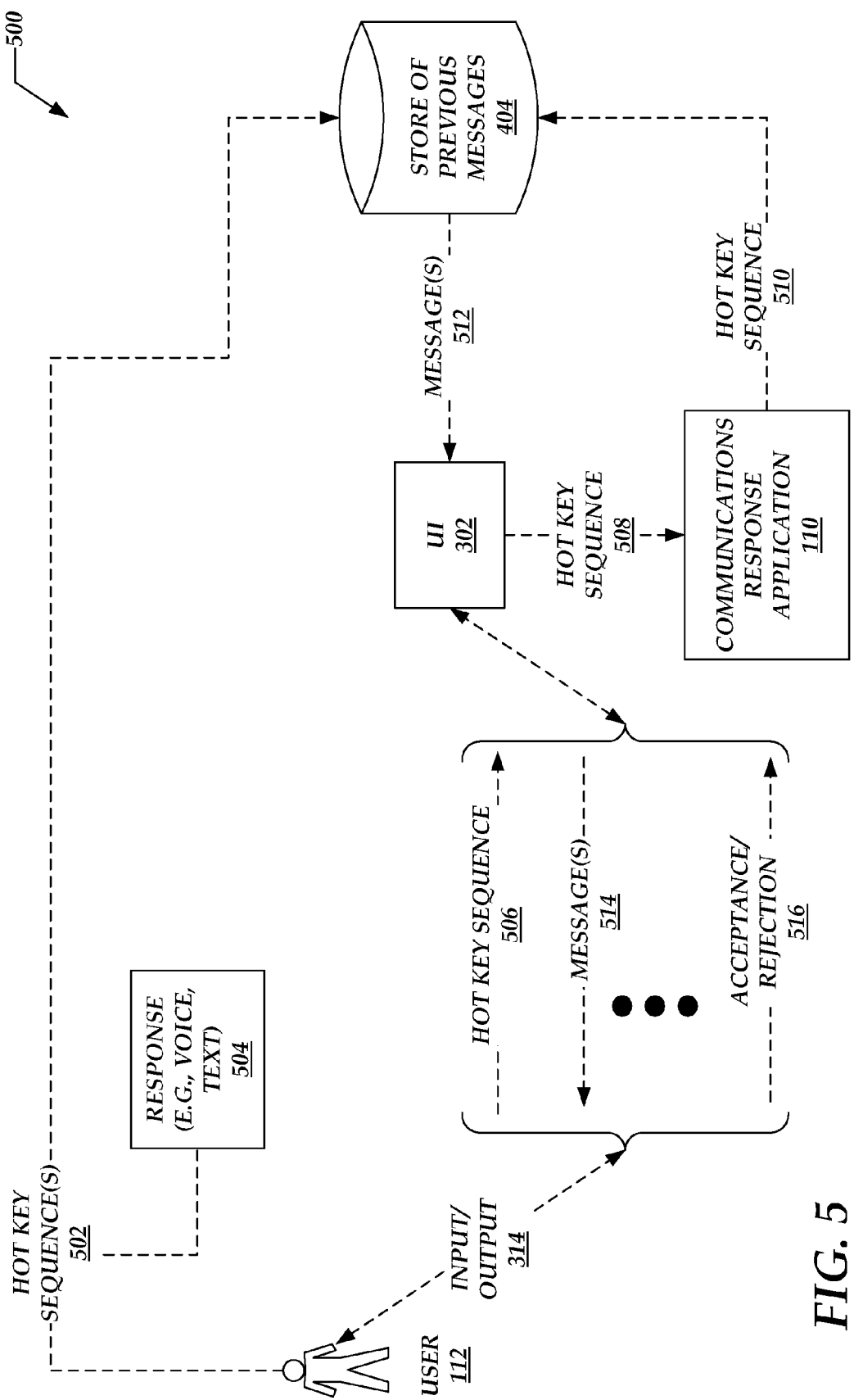
FIG. 5 is a combined block and flow diagram illustrating components and related flows for responding to hot key sequences defined by particular users.

FIG. 5 illustrates components and flows, denoted generally at 500, related to responding to hot key sequences defined by particular users. For example, a given user 112 may determine that he or she repeatedly uses a given set of text and/or voice responses in responding to secondary communications. Accordingly, the user may program a keyboard or other suitable input device to generate and send selected one of these text and/or voice messages, in response to the user activating a predefined hotkey sequence. For example, the user may define the hotkey sequence to be activated by pressing one or more of the "function" keys (i.e., F1-F12) defined within a keyboard, by simultaneously pressing two or more alphanumeric keys, or by other suitable techniques.

FIG. 5 denotes predefined hot key sequences generally at 502, with particular sequences of keys causing the playback or sending of particular responses or messages 504. In turn, a suitable storage element, such as the store 404 (carried forward from FIG. 4 for convenience of description, but not to limit implementations), may store any number of these hot key sequences for particular users 112.

When a user, such as the example user 112, receives a notification of a secondary communication, the user 112 may respond to this notification by activating one of his or her predefined hot key sequences. For example, if the user 112 has defined a plurality of hot key sequences by assigning predefined voice and/or text responses to particular function keys, the user may respond to the secondary communication with a particular message by activating the function key to which that message is assigned. In this manner, the user may respond to secondary communications using relatively few keystrokes (e.g., one or two), thereby demanding relatively little attention from the user, and minimizing any distraction from the active communication in which the user may be involved.

In general, FIG. 5 denotes an activated hotkey sequence at 506, as received by the UI 302. In turn, the UI may forward the hotkey sequence to the communications response application 110, as denoted at 508. The communications response application may search a store 404 of pre-recorded previous messages using the hotkey sequence as input, as denoted at 510. Assuming that the input hotkey sequence is associated with a predefined message or response (e.g., a voice message, text message, or other suitable message), the store 404 may return the predefined message or response associated with the input hotkey sequence, as denoted at 512. The UI 302 may present to the user the predefined message as retrieved from the store 404, as represented at 514.

The user 112 may accept or reject the retrieved message 514 as appropriate, before the message is sent in response to the secondary communication. For example, the user 112 may briefly review the retrieved message 514 to be sure that he or she activated the appropriate hotkey sequence, before sending the message as a response. If the user accepts the retrieved message 514, he or she may request that the message be sent. Otherwise, if the retrieved message 514 is incorrect, the user may activate a different hotkey sequence, until the desired message is successfully retrieved. FIG. 5 generally represents at 516 any acceptances or rejections of the retrieved message 514.

Figure 6:
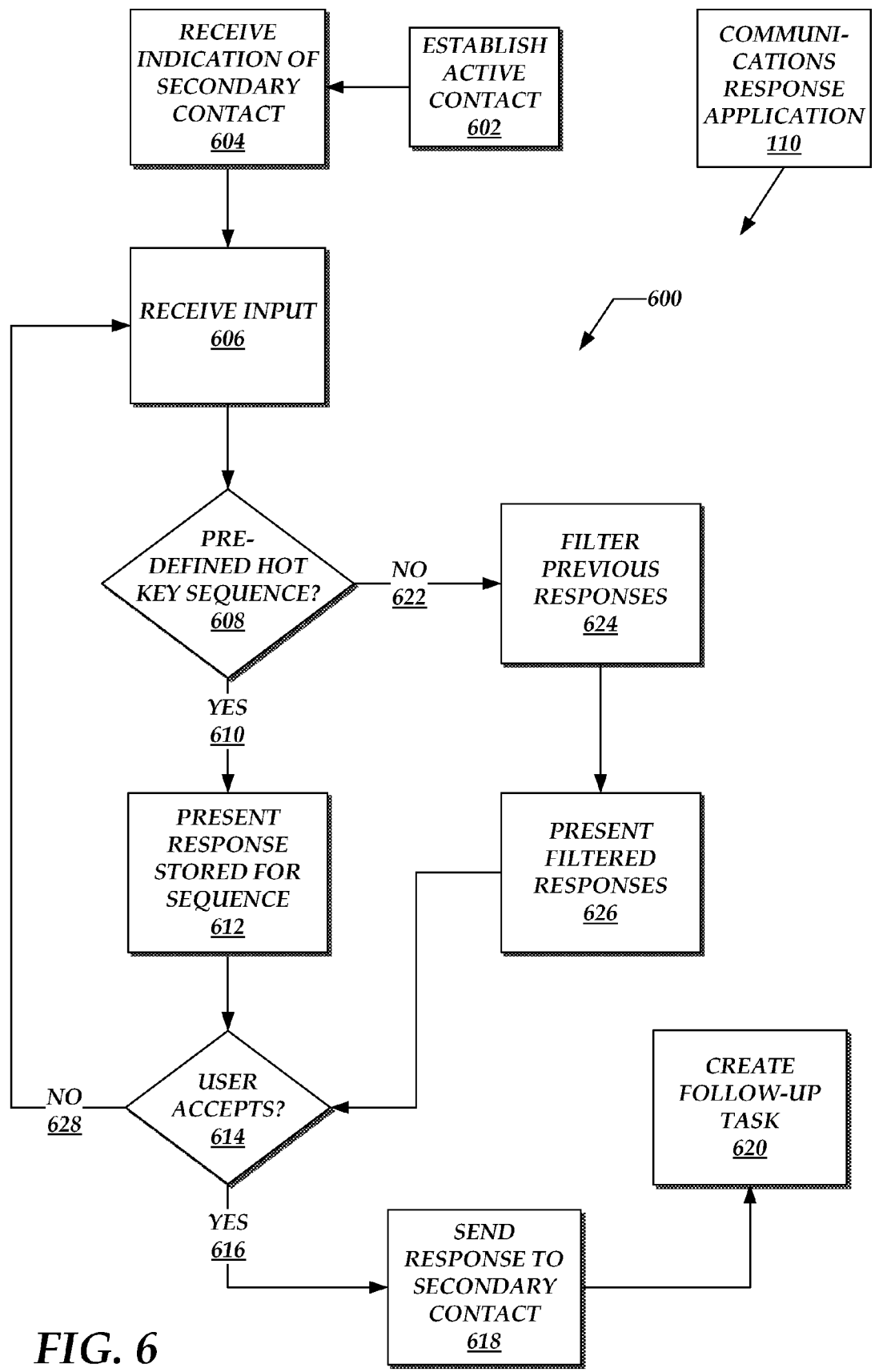
FIG. 6 is a flow diagram illustrating processes for storage and expedited retrieval of messages and responses in multi-tasking environments.

FIG. 6 illustrates process flows, denoted generally at 600, for storage and expedited retrieval of messages and responses in multi-tasking environments. For purposes of this description, but not to limit possible implementations, the process flows 600 are illustrated and described herein as being performed by the communications response application 110. However, implementations of this description may perform the process flows 600 using other components without departing from the scope and spirit of this description. In addition, these process flows are described as proceeding in certain orders only for purposes of this description, and implementations of these process flows may proceed in different orders as well.

Turning to the process flows 600 and more detail, block 602 generally represents establishing a active contact or communication involving a given user (e.g., 112) interacting with a client system (e.g., 102). FIG. 2 illustrates examples of a active communication at 202, and these active communications may be voice-based, text-based, or may take other convenient forms.

Block 604 generally represents receiving an indication of at least one secondary contact or communication that occurs during the active communication established in block 602. As described above, the secondary contact or communication may be incoming or outgoing. FIG. 2 provides examples of such secondary communications at 204, 206, and 208. Block 604 may also include receiving a selection of one or more of these secondary communications or conversations for an expedited response. As described above, a suitable user interface (UI) may include depictions or representations of any number of incoming or outgoing secondary communications, along with corresponding selection tools (e.g., 306 and 308 in FIG. 3) that are responsive to user input to activate the corresponding secondary communication for an expedited response.

Block 606 generally represents receiving user input directed to a selected secondary contact. For example, the UI described above may include text entry fields that may receive alphanumeric input from the users (e.g., input/output tool 312 in FIG. 3). In these scenarios, block 606 may include receiving such alphanumeric input, or may include receiving hotkey sequences for activating messages or responses predefined by the user.

Decision block 608 generally represents determining whether the input received in block 606 represents a predefined hotkey sequence. If so, the process flows 600 may take Yes branch 610 to block 612. Block 612 represents retrieving and presenting the response or message stored for the hotkey sequence received in block 606.

In turn, decision block 614 represents determining whether the user accepts or rejects the response presented in block 612. For example, in a scenario in which the user activates a predefined hotkey sequence, block 614 may include determining whether the user approves the response or message presented in response to the activated hotkey sequence.

From decision block 614, if the user accepts the response or message presented in block 612, the process flows 600 may take Yes branch 616 to block 618, which represents sending the response or message to the secondary contact. In some scenarios, the process flows may proceed directly from block 606 to block 618, as represented by the dashed arrow in FIG. 6 connecting these two blocks. For example, block 604 may receive a user selection of a secondary contact, block 606 may receive a hot key sequence directed to the selected secondary conversation, and block 618 may send the message or response corresponding to the hot key sequence to the selected secondary contact. In some implementations, the process flows 600 may then proceed to block 620, which represents creating a follow-up task or work item to remind the user to contact the person who initiated the secondary contact.

Returning to decision block 608, if the input received in block 606 is not a predefined hotkey sequence, the process flows 600 may take No branch 622 to block 624. More specifically, if the input received in block 606 is not a predefined hotkey sequence, then most likely the input is alphanumeric keystroke data entered by the user as a preliminary response to the secondary contact. Block 624 represents filtering a store of previous responses or messages (e.g., 404 in FIG. 4) using the current input from the user, and selecting those previous messages or responses that match the current input.

In turn, block 626 represent presenting one or more of the filtered responses to the user for approval or rejection. Afterwards, decision block 614 evaluates whether the user has accepted one of the filtered responses for sending in response to the secondary contact. If so, in the process flows 600 may perform blocks 618 and 620 as described above.

Returning to decision block 614, if the user does not accept any of the filtered responses presented in block 626, the process flows 600 may take No branch 628 to return to block 606, to receive additional input from the user. For example, in a scenario in which the user is providing alphanumeric keystroke input as an expedited response to the secondary contact, the more characters that the user provides, the more precisely that block 626 may filter previous responses.

Returning briefly to the scenario in which the user is activating a hotkey sequence to provide the expedited response, if the user activated the wrong hotkey sequence for a particular secondary contact, then a process flows 600 may take No branch 628 from decision block 614. In this case, block 606 may include the user activating a different predefined hotkey sequence.

In the foregoing manner, the process flows 600, as well as the related component and UI infrastructure described in FIGS. 1-5, may enable the user to provide preliminary, expedited responses to secondary communications or contacts, while also maintaining a active communication in an active state. More specifically, the process flows 600 may enable the user to provide these expedited responses, without substantially interrupting his or her participation in the active communication, and with minimal distraction from the active communication. These expedited messages may perform a variety of different functions, including indicating when the user expects to be able to communicate more fully with the person initiating the secondary communication, quickly answering questions from such persons, providing additional information to such persons to follow-up on more comprehensive indications that recently concluded, or the like. In addition, the techniques described herein may enable users to provide these expedited responses using relatively few keystrokes or other input actions, as compared to typing out a complete text-based message.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

In addition, certain process and data flows are represented herein as unidirectional only for the purposes of facilitating this description. However, these unidirectional representations do not exclude or disclaim implementations that incorporate bidirectional flows.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. At least one computer-readable storage medium that is not a signal having computer-executable instructions stored thereon which, when executed by a computer, cause the computer to perform a method comprising:

establishing a voice-only based active communication with a first contact; receiving an indication of at least a secondary communication involving a second contact, the secondary communication comprising an incoming voice only-based communication occurring during the active communication;

presenting a user interface (UI) to a user that includes at least a representation of the secondary communication;

receiving, through the UI, a selection of the secondary communication for conveying an expedited response;

receiving input from the user that selects a predefined voice message stored in memory to be provided as the expedited response to the secondary communication, while maintaining the active communication in an active state;

evaluating whether the input for selecting the predefined voice message corresponds to at least one previous response provided by the user to provide a voice message to a prior instance of secondary communication; and providing the expedited response comprising the predefined voice message to the secondary communication based upon the input received from the user, wherein the instructions for receiving input from the user include instructions for receiving input that selects a predefined hot key sequence, wherein the instructions for receiving input from the user include instructions for matching, at least part of the input comprising alphabetic characters with at least one previous input provided by the user, further including instructions for filtering a plurality of responses, previously provided by the user, against the input received from the user, wherein the instructions for providing the response to the secondary communication include instructions for providing at least one response comprising a stored voice message previously provided by the user, filtered against the input received from the user; and further comprising instructions for creating a follow-up task for the user to remind the user to contact a person initiating the secondary communication.

2. The storage medium of claim 1, wherein the secondary communication provides additional information to follow-up on a recently-concluded active communication.

* * * * *